United States Patent [19]

Ackermann

[11] 3,857,823
[45] Dec. 31, 1974

[54] PREPARATION OF SULFOXIDE SORBENTS

[75] Inventor: Guenter R. Ackermann, Newton Square, Pa.

[73] Assignee: Rohm and Hass Company, Philadelphia, Pa.

[22] Filed: Feb. 11, 1972

[21] Appl. No.: 225,643

[52] U.S. Cl. .............. 260/79.3 R, 270/24, 270/502, 260/79.3 MU
[51] Int. Cl. ............................................. C08f 27/06
[58] Field of Search................ 260/79.3 R, 79.3 MU

[56] References Cited
UNITED STATES PATENTS

| | | | |
|---|---|---|---|
| 2,735,841 | 2/1956 | Allen.............................. | 260/79.3 R |
| 2,874,117 | 2/1959 | Hwa...................................... | 210/32 |
| 3,278,463 | 10/1966 | O'Neill................................ | 260/2.2 |
| 3,278,498 | 10/1966 | Rudner.......................... | 260/79.3 R |

OTHER PUBLICATIONS

Shriner, R. L. et al., J. Am. Chem. Soc., 52, 2065–2066, (1930).

*Primary Examiner*—Christopher A. Henderson
*Attorney, Agent, or Firm*—Michael B. Fein

[57] ABSTRACT

Novel essentially non-ionogenic, macroreticular, water-insoluble, cross-linked polymers, having utility as adsorbent resins in the decolorization of effluents containing waste dyestuffs are disclosed. These polymers are based on an aromatic, monovinyl compound, cross-linked by copolymerization with an aromatic polyvinyl compound, the polymer containing sulfinyl substituents on the aromatic nucleii.

6 Claims, No Drawings

PREPARATION OF SULFOXIDE SORBENTS

This invention relates to novel sulfinylated derivatives of macroreticular aromatic-based cross-linked, polymeric resins. In another aspect, it relates to a process for readily preparing sulfoxide derivatives of such aromatic resins via Friedel-Crafts alkylation type reaction.

The novel resins of this invention are cross-linked polymers of aromatic vinyl compounds which contain aromatic sulfinyl substituents on the recurring aromatic ring of the polymer. The introduction of such groups into divinyl benzenestyrene type of copolymers tend to reduce resin porosity and surface area to some degree, but concurrently, confer a new spectrum of adsorption properties not observed with their non-sulfinylated prior art precursors.

The novel resins of this class are readily prepared by first forming the convention of copolymer (See U.S. Pat. No. 3,531,463), and then subjecting the base copolymer to the sulfinylation procedure disclosed herein.

Resin D of the present invention (later defined herein) has been demonstrated to be an exceptionally efficient sorbent for the removal of color from waste dye streams.

PRIOR ART

The reaction of benzene with thionyl chloride or sulfur dioxide in the presence of aluminum chloride was reported in the literature in 1887 to give diphenyl sulfoxide in high yield. (Colby and McLaughlin, Ber. 20, 195 (1887). The reaction of toluene with thionyl chloride in the presence of aluminum chloride was reported by Parker in 1890 (Ber. 23, 1844 (1890)).

No reference has been found suggesting how this reaction be carried out on a cross-linked polymeric backbone. Polymers containing sulfoxide have been reported in the literature. Their normal preparation is via the oxidation of the polymeric thio ether, polycondensation of sulfoxide containing bifunctional compounds, the polymerization of alkylvinyl sulfoxides under anionic conditions, or the condensation of arene sulfinic acids in concentrated sulfuric acid.

According to the present invention, the basic reaction is postulated as the formation of a diarlysulfoxide according to the following:

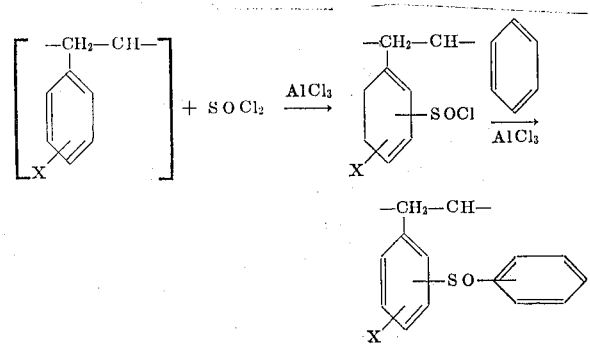

wherein X is $-CH_2-CH_2-$, lower alkyl to three carbons, or vinyl, or H. Some sulfoxide is undoubtedly formed between the aromatic groups in the polymer chains. However, the high level of cross-linking of these polymers inhibits this reaction making it desirable to add benzene (or other aromatic compounds) to bring about a more complete reaction.

The initial preparation of a polymeric sulfoxide via the thionyl halide reaction may be carried out on an aromatic compolymer, such a copolymer of divinylbenzene and styrene, an 85:15 ratio in the first experiment, and a 50:50 monomer ratio in the second run were demonstrated. In both initial preparations, no benzene (or toluene) were added.

Both reaction products were found to be high in chlorine content. While a material of this character may be useful in itself, it is deemed more desirable to carry out subsequent reaction. Thus, such reactions were carried out, where benzene or toluene were added, and were found to assure a more complete reaction. Those $-SO-$Hal groups remaining will be hydrolyzed to $-SOOH$ groups upon contact with water.

The base polymer is most conveniently formed from styrene and divinylbenzene. Both of these materials are readily available and may be easily copolymerized by well known methods to give an insoluble polymer that possesses excellent physical and chemical properties. The divinylbenzene component of such a copolymer gives to the polymeric molecule a cross-linked structure which greatly increases the complexity of the molecule and decreases its solubility and compatibility with other materials.

By varying the amount of the divinylbenzene used in the preparation of the copolymer, variations can be made in the physical properties of the polymeric material which carry through to the final material and which have a marked effect upon its utility.

In general, the divinylbenzene (DVB) component may vary from 0.1 to 98 percent of the total polymerizable materials on a weight basis. In practice, however, it is preferable to use at least 20 percent, and for most purposes no benefit is derived from using over 90 of DVB.

The remainder of the base polymer comprises aromatic monovinyl compounds which vary from 99.9 to 2 percent of the total material on a weight basis. In practice, the preferred range is 80 down to 10 percent.

In the place of the usual styrene, other aromatic monovinyl compounds can be used, and in place of divinylbenzene, other polyvinyl aromatic compounds can be used. Ortho, meta- and para-methyl styrenes; ortho-, meta-, and para-ethyl styrenes; and vinyl naphthalene are suitable monovinyl aromatic compounds.

Examples of the alkyl-substituted, di- and tri-vinyl benzenes are the various vinyltoluenes, the divinyltoluenes, the divinylxylenes, divinylethylbenzene, 1,4-divinyl - 2,3,5,6-tetramethylbenzene, 1,3,5-trivinyl - 3,4,6-trimethylbenzene, 1,4-divinyl, 2,3,6-triethylbenzene, 1,2,4-trivinyl -3,5-diethylbenzene, 1,-3,5-trivinyl-2-methylbenzene. What has been said above concerning the useful ranges of divinylbenzene as a cross-linking agent applies to these materials as well.

Other sulfinylating agents which may be usefully employed in place of thionyl chloride or bromide include: benzene sulfinyl chloride, toluene sulfinyl chloride, benzene sulfinyl bromide and toluene sulfinyl bromide. Other agents, in addition to those exemplified above, and which will be readily apparent to those skilled in this art, may be usefully substituted in this procedure to achieve the desired sulfinylation.

The base polymeric material may be formed by any of the known polymerization processes, such as polymerization in mass, in solvents for the monomeric material, or in emulsion or suspension in a liquid that is not a solvent for the monomeric material. The last is the preferred method because it produces the polymer directly in the form of small spheroids or beads, the size of which can be regulated and controlled.

Since the cross-linked base polymer is insoluble in ordinary solvents, subsequent reactions must be carried out in a two-phase system. Furthermore, since the ultimate adsorbtion resin is used in the form of small particles, it is desirable to carry out the subsequent sulfinylation steps upon particles of the base resin that will give the desired particle size in the finished resin. By adjustments in the composition of the suspending medium, and in the rate of agitation during polymerization, the suspension polymerization process may be made to produce spheroids or beads of effective particle size from 5 to 325 mesh U.S. Sieve Series. In some sorption processes, extremely fine particles of approximately 40 to 150 microns in diameter are particulalr useful. In others, larger particles are desired such as would pass a 30mesh screen but not a 50-mesh. The ease with which the subsequent step of sulfinylation may be carried out depends to some extent upon the particle size of the base polymer being treated and also upon its porosity. Small particles and porous polymers are more readily treated than are larger particles of denser polymers.

The polymerization of the vinyl compounds is accelerated by means of well known catalysts which provide oxygen. These catalysts include ozone; organic peroxidic agents typified by ozonides, peroxides such as acetyl peroxide, lauroyl peroxide, stearoyl peroxide, tert-butyl hydroperoxide, benzoyl peroxide, tert-butyl perbenzoate, di-tert, -butyl diperphthalate, di-tert-butyl peroxide, and the barium salt of tert-butyl hydroperoxide; inorganic agents such as barium peroxide, sodium peroxide, hydrogen peroxide; and the so-called "per" salts such as the water-soluble perborates, persulfates, and perchlorates. The catalysts are employed in suitable amounts ranging from 0.1 to about 2 percent based on the weight of the monomeric material to be polymerized.

According to the present invention, there is used an essentially non-ionogenic, macroreticular, cross-linked polymer of the addition type, which is insoluble in the medium and is not appreciably swollen by the compound to be separated or concentrated. The macroreticular polymer, which under most conditions is of 16 to 100 mesh in particle size, but for some special purposes may be as small as about 400 mesh, has a porosity of at least 10 percent (percent volume of pores in the resin body or bodies) and a surface area of at least 10 square meters per gram of the resin (up to 2,000 square meters per gram.)

In general, since these resins find their greatest value in the processing of aqueous solutions, they are preferably not extremely hydrophobic or water-repellent.

The process of the present invention accordingly involves a step of contacting the aqueous medium containing the dissolved water-soluble or water-dispersible substance with the water-insoluble macroreticular resin in the form of particles, such as granules or beads, to adsorb the substance on the surface of the resin. Subsequently, desorbing the substance that is adsorbed in the first step may also be an optional and economical procedure.

The macroreticular resins employed as the precursors herein are not claimed as new compositions of matter in themselves. Any of the known materials of this type are suitable. For example, there may be used the granular cross-linked polymers of this character prepared by suspension polymerization of polymerizable ethylenically unsaturated molecules comprising about 2 to 100 weight percent of at least one poly(-vinyl)benzene monomer selected from the group consisting of divinylbenzene, trivinylbenzene, alkyldivinylbenzenes having from 1 to 4 alkyl groups of 1 to 2 carbon atoms substituted in the benzene nucleus, and alkyltrivinyl benzenes having one to three alkyl groups of one to two carbon atoms substituted in the benzene nucleus.

Besides the homopolymers and copolymers of these poly (vinyl) benzene monomers, one or more of them may be copolymerized with up to 98 percent (by weight of the total monomer mixture) of (1) monoethylenically unsaturated monomers; or (2) polyethylenically unsaturated monomers other than the poly(vinyl) benzenes just defined; or (3) a mixture of (1) and (2).

There results in the present invention, a novel polymer of an aromatic polyvinyl hydrocarbon, the polymer containing as substituents on the aromatic nucleii, sulfinyl groups of the formula —SOX wherein X is an aryl groups having six to twelve carbons, including phenyl, tolyl, naphthyl, xylyl, mesityl, and substituted naphthyls.

The preferred polymers herein contain sulfinyl groups as the substituents on the aromatic nucleii, further wherein the styrene component is cross-linked by copolymerization with from 20 to 90 weight percent of the divinylbenzene component.

EXAMPLE I

Synthesis of a Porous Copolymer Containing Diaryl Sulfoxide Functionalities (Resin D)*

To a blackened 5-liter flask, equipped with a stirrer, condenser, gas inlet tube, and a thermometer are added 504 grams of dried Resin A* (DVB-Styrenenn copolymer) and 1600 grams of ethylene dichloride, to completely swell the Resin (established as needed for complete reaction). A sweep of dry nitrogen is started and the beads are allowed to swell for 30 minutes at room temperature with agitation.

(*See Table 1 for chemical identity.)

In a separate flask, 524 grams of thionyl chloride is dissolved in 800 grams of ethylene dichloride and 426.4 grams of solid, anhydrous aluminum chloride are added to the stirring solution while maintaining the temperature under 35°C. After all the aluminum chloride has dissolved, the mixture is added to the pre-swollen beads** at a rate such that the temperatuure remains below 35°C.

(**During this step and subsequent steps until the reaction is quenched, hydrogen chloride gas is liberated. Precautions are taken so that the batch will not purge as a result of rapid gas evolution. The times and conditions given here should prevent such rapid liberation of hydrogen chloride.)

The flask is stirred at room temperature ( < 35°C.) for two hours and then is slowly heated over a period of about 1 hour to reflux temperature (80°–85°C) Reflex is maintained for an additional 2 hours, and then the reaction is cooled to about 10°C. in an ice bath. There then is added 800 grams of benzene, at a rate such that the temperature does not exceed 30°C. After all the benzene has been added, the reaction mixture is stirred at room temperature (< 35°C.) for one hour. Heat is then slowly applied to attain reflux and the reaction is maintained at reflux temperature for 2 hours. The mixture is cooled to 15°C. and then quenched by pouring same into 4,000 ml. of an ice-cold, 10% hydrochloric acid — water mixture at a rate such that the temperature does not exceed 50°C.

The quench solution is stirred for two hours to decompose aluminum salts after which the beads are filtered and washed twice with water. The beads are retransferred as a slurry to the reaction flask and an azeotrope distillation procedure is performed to remove imbibed organic solvents. The excess water is siphoned from the flask, and the beads are washed with additional water until the wash water is neutral to pH paper. Excess water is siphoned from the flask and the beads are packed out wet. A 20 to 30 mesh cut is dried and measured for physical properties.

| | |
|---|---|
| Appearance: | Opaque brown beads |
| Elemental Analysis: | 8.28% S |
| | 5.26% O |
| | 1.61% Cl |
| | 75.29% C |
| | 7.24% H |
| Apparent Density: | 0.731 grams/cm$^3$ |
| Skeletal Density: | 1.218 grams/cm$^3$ |
| Porosity: | 39.9 volume percent |
| Surface Area: | 319 meters$^2$/gram |
| Average Pore Diameter: | 68 Angstroms |

TABLE I

The chemical nature of the exemplary macroreticular resins which were subjected to the process of the present invention or evaluated herein are as follows:

Resin A: A copolymer of 50% DVB and 50% styrene plus ethylvinylbenzene (EVB) (U.S. Pat. No. 3,531,463).

Resin B: A copolymer of 85% divinylbenzene (DVB) plus 15% styrene-ethylvinylbenzene (U.S. Pat. No. 3,531,463).

Resin C: A copolymer of 20% DVB and 80% styrene plus EVB (U.S. Pat. No. 3,531,463).

Resin D: Resin A which was post-reacted to contain a diarylsulfoxide functionality.

EXAMPLE II

The procedure of Example I may be employed to produce a variety of sulfinylated resins falling within the scope of the present invention by varying the proportions of moles of $SOCl_2$, moles of $AlCl_3$: and choice of swelling solvent and coreactant.

A representative number of thusly treated resins were prepared with the principal reaction conditions, some resulting parameters, being as set forth in Table II:

TABLE II

| Base Resin | Moles of Resin | Moles of $SOCl_2$ | Moles of $AlCl_3$ | AlCl Added as | Swell Solv. | Coreactant | % S | Appar. Dens. (G./cc) | Skeletal Density (G./cc) | Por. ml/ml | Surf. Area m$^2$/g. | Aver. Pore Diameter A |
|---|---|---|---|---|---|---|---|---|---|---|---|---|
| B | 0.5 | 0.3 | 0.5 | Solid | EDC | None | 9.06 | — | | | | |
| A | 0.5 | 0.3 | 0.5 | Solid | EDC | None | 6.94 | — | | | | |
| C | 0.5 | 0.5 | 0.5 | Solid | EDC | benzene | 12.96 | | | | | |
| A | 0.5 | 0.5 | 0.5 | Solid | EDC | benzene | 7.13 | .770 | 1.245 | .381 | 263 | 75 |
| A | 0.5 | 0.55 | 0.5 | Solid | EDC | benzene | 8.70 | — | | | | |
| B | 0.5 | 0.55 | 0.5 | Solid | EDC | benzene | 10.10 | — | | | | |
| A | 0.5 | 0.55 | 0.5 | Solid | EDC | toluene | 7.65 | — | | | | |
| B | 0.5 | 0.55 | 0.5 | Solid | toluene | 9.04 | — | | | | | |
| A | 0.5 | 3.3 | 0.5 | Solid | $SOCl_2$ | benzene | 9.15 | .759 | 1.293 | .412 | 268 | 81 |
| B | 0.5 | 3.3 | 0.5 | Solid | $SOCl_2$ | benzene | 12.22 | — | | | | |
| B | 0.5 | 0.55 | 0.5 | Solution | EDC | benzene | 7.78 | — | | | | |
| A | 0.5 | 0.55 | 0.5 | Solution | EDC | benzene | 7.77 | — | | | | |
| A | 0.5 | 0.55 | 0.5 | Solution | EDC | benzene | 6.97 | .750 | 1.237 | .393 | 292 | 72 |
| A | 0.5 | 0.55 | 0.4 | Solution | EDC | benzene | 8.61 | — | | | | |
| A | 0.5 | 0.55 | 0.3 | Solution | EDC | benzene | 7.92 | — | | | | |
| A | 4.0 | 4.4 | 3.2 | Solution | EDC | benzene | 8.28 | .731 | 1.218 | .399 | 319 | 68 |

I claim:

1. A water-insoluble macroreticular polymer of an aromatic mono-vinyl compound crosslinked by copolymerization with an aromatic polyvinyl compound, said polymer containing as substituents on the aromatic nucleii, sulfinyl groups of the formula —SOX wherein X is an aryl group.

2. A polymer containing sulfinyl groups as the substituents on the aromatic nucleii of claim 1 wherein styrene is cross-linked by copolymerization with from 0.1 to 98 weight percent divinylbenzene.

3. The process of preparing a macroreticular, water-insoluble crosslinked aromatic resin containing reactive sulfinyl groups and capable of being converted to an insoluble adsorption resin, which comprises subjecting a polymer of an aromatic monovinyl hydrocarbon crosslinked by copolymerizing with an aromatic polyvinyl hydrocarbon, in the form of a macroreticular resin of a size from 5 to 200 mesh, to the action of a Friedel Crafts catalyst and a sulfinylating agent and further treating with an aromatic compound to convert terminal halo sulfinyl groups to aromatic sulfinyl groups.

4. The process of claim 3 wherein said agent is a halo sulfinylating agent, in which the halogen is selected from the groups consisting of chlorine and bromine.

5. A process of sulfinylating an aromatic-based, cross-linked polymeric resin to enhance its physical properties as a selective adsorbent comprising:
 a. dispersing the particulated resin in an appropriate polar solvent and permitting the particulated resin to partially swell;
 b. separately admixing the sulfinylating agent in a polar solvent with a predetermined amount of a solid anhydrous metal halide acting as a catalytic agent in a polar solvent;

c. admixing the preparations of steps (a) and (b) at a rate which maintains the temperature of the reaction mixture below a predetermined value with stirring for a preset period;
d. heating to reflux temperature and maintaining at reflux for a period of 1 to 10 hours, followed by substantial cooling of the reaction mixture;
e. adding an aromatic compound at a rate which maintains the resulting reaction mixture below a preset temperature;
f. again heating slowly to reflux temperature and maintaining thereat until to complete the alkylation reaction; and
g. cooling the reaction mixture in aqueous medium to decompose the aluminum salts that have formed.

6. The method of claim 5 wherein said particulated resin is a copolymer prepared from a monomer system consisting of:

a. monoethylenically unsaturated monomers selected from one of the methyl styrenes, the ethyl styrenes and vinyl naphthalene, styrene, and
b. a polymerizable ethylenically unsaturated molecule having about 0.1 to 98 weight percent of at least one poly-(vinyl) benzene monomer selected from the group consisting of divinylbenzene, trivinylbenzene, alkyl, di- and tri-vinyl-benzenes benzenes having from one to four alkyl groups of one to two carbon atoms each substituted in the benzene nucleus; which copolymer has high polar functionality and a porosity of at least 20 percent, a surface area of at least 50 up to 1,000 square meters per gram, and having pores with an average pore diameter of 20 Angstrom units ranging up to 500.

* * * * *